(12) United States Patent
Scheller

(10) Patent No.: US 11,889,048 B2
(45) Date of Patent: Jan. 30, 2024

(54) ELECTRONIC DEVICE AND METHOD FOR SCANNING AND RECONSTRUCTING DEFORMABLE OBJECTS

(71) Applicant: Sony Group Corporation, Tokyo (JP)

(72) Inventor: Lars-Peter Scheller, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/399,070

(22) Filed: Aug. 11, 2021

(65) Prior Publication Data

US 2022/0060676 A1 Feb. 24, 2022

(30) Foreign Application Priority Data

Aug. 18, 2020 (EP) .................................... 20191475

(51) Int. Cl.
*H04N 13/254* (2018.01)
*H04N 13/239* (2018.01)

(52) U.S. Cl.
CPC ......... *H04N 13/254* (2018.05); *H04N 13/239* (2018.05)

(58) Field of Classification Search
CPC .... H04N 13/254; H04N 13/239; G01B 11/16; G01B 11/24; G01B 11/002; G06T 7/0002; G06T 7/246; G06T 7/60
USPC .......................................................... 348/47
See application file for complete search history.

(56) References Cited

U.S. PATENT DOCUMENTS

| 10,529,754 B2* | 1/2020 | Nam ................. H01L 27/14627 |
| 2009/0079987 A1* | 3/2009 | Ben-Ezra ............ G01N 21/474 356/445 |
| 2011/0290005 A1* | 12/2011 | Hart ........................ G06F 30/00 73/37.9 |
| 2012/0253200 A1* | 10/2012 | Stolka .................... A61B 90/13 600/459 |
| 2013/0027515 A1* | 1/2013 | Vinther .................. A61B 1/227 348/E13.02 |
| 2014/0146132 A1* | 5/2014 | Bagnato ................. H04N 23/45 348/36 |
| 2019/0388194 A1* | 12/2019 | Atiya ....................... A61B 1/24 |

FOREIGN PATENT DOCUMENTS

| CN | 104244830 A | 12/2014 |
| CN | 208206469 U | 12/2018 |
| JP | 2006-067197 A | 3/2006 |

OTHER PUBLICATIONS

Sferrazza et al., "Design, Motivation and Evaluation of a Full-Resolution Optical Tactile Sensor", Sensors, Institute for Dynamic Systems and Control, Feb. 22, 2019, pp. 1-22.
Hullin et al., "Fluorescent immersion range scanning" ACM SIGGRAPH Conference Proceedings, Aug. 2008, vol. 27 87-1, http://citeseerx.ist.psu.edu/viewdoc/download?doi=10.1.1.226.7409&rep=rep1&type=pdf.

(Continued)

*Primary Examiner* — Susan E. Torgerson
(74) *Attorney, Agent, or Firm* — XSENSUS LLP

(57) ABSTRACT

An electronic device comprising circuitry configured to capture an image of a pattern of light emitting photoluminescence particles embedded in an object, and reconstruct the shape of the object based on the captured image of the pattern of light emitting photoluminescence particles embedded in the object.

23 Claims, 9 Drawing Sheets

(56) References Cited

OTHER PUBLICATIONS

Bing Pan, "Digital image correlation for surface deformation measurement: historical developments, recent advances and future goals", Institute of Solid Mechanics, Measurement Science and Technology vol. 29, 2018, 32 pp, https://doi.org/10.1088/1361-6501/aac55b.

Pekkola, O. et al., "Focus-Induced Photoresponse: a novel way to measure distances with photodetectors", Scientific Reports, Jun. 15, 2018, pp. 1-8.

Shao, X. et al., "Real-time 3D digital image correlation method and its application in human pulse monitoring", Applied Optics, Feb. 2016, pp. 696-704. https://www.researchgate.net/publication/291385692.

Song, Y.M et al., "Digital cameras with designs inspired by the arthroped eye", Nature, Macmillan Publishers Limited, vol. 497, May 2, 203, pp. 1-36.

\* cited by examiner

ELECTRONIC DEVICE AND METHOD FOR SCANNING AND RECONSTRUCTING DEFORMABLE OBJECTS

CROSS-REFERENCE TO RELATED APPLICATION

The present application claims priority to EP 20191475.1, filed Aug. 18, 2020, the entire contents of which is incorporated herein by reference.

TECHNICAL FIELD

The present disclosure generally pertains to the field of user interfaces for electronic devices, in particular to the field of flexible (or deformable) user interfaces.

TECHNICAL BACKGROUND

Generating a digital representation of real-life objects is an important topic in a wide range of applications such as augmented reality (AR), virtual reality (VR), robotics and gaming. The generation of such digital representation may be based on measurement methods/technologies allowing for the exact sensing of a physical shape of objects and on computational algorithms transforming the raw physical sensing data into virtual objects. A distinction may be made between solid objects and deformable objects. The shape of solid objects may usually be static and may require only a one-time scanning process. The shape of deformable objects may be a dynamically changing shape and may require repeated and/or even continuous scanning. There are established methods (e.g. laser scanning or camera-based) which allow for high quality scanning of static solid objects because these objects may usually be scanned in a dedicated and optimized environment and time may not be a critical parameter. If the methods for scanning of static solid objects are also applied to deformable objects significant limitations regarding their feasibility in actual real-global applications may occur. Real-time tracking of dynamic changes in the shape of a deformable objects may be important in this context. State of the art systems for determining object shapes dynamically, like for example recording an object from the outside using optical systems (e.g. visual-based, laser scanning or structured light) may require a dense mesh of electrical/optoelectrical sensors on the surface of an object or are complex and build on expensive hardware (e.g. fibre optic strain sensing (FOSS)). With regards to shape sensing of highly flexible and deformable (e.g. bendable, stretchable) objects, each of these methods may have certain disadvantages, like common non-contact based optical methods which may for example require a free view of the object and sensing of the full shape in 3D may require several cameras distributed in a relatively large volume around the object. Further, contact based electrical methods which make use of an (opto-) electrical sensor array (strain, resistance) attached to an object or optical fibres (FOSS) embedded into the surface of an object may strongly limit the deformability of the object due to constraints imposed by the sensors and/or electrical/optical connections itself. Still further, FOSS may require a bulky and expensive optical setup.

Therefore, it is desirable to provide methods and devices which provide improved scanning and reconstructing of deformable objects.

SUMMARY

According to a first aspect the disclosure provides an electronic device comprising circuitry configured to capture an image of a pattern of light emitting photoluminescence particles embedded in an object, and reconstruct the shape of the object based on the captured image of the pattern of light emitting photoluminescence particles embedded in the object.

According to a second aspect the disclosure provides a method comprising capturing an image of a pattern of light emitting photoluminescence particles embedded in an object, and reconstructing the shape of the object based on the captured image of the pattern of light emitting photoluminescence particles embedded in the object.

Further aspects are set forth in the dependent claims, the following description and the drawings.

BRIEF DESCRIPTION OF THE DRAWINGS

Embodiments are explained by way of example with respect to the accompanying drawings, in which.

Figure 1:
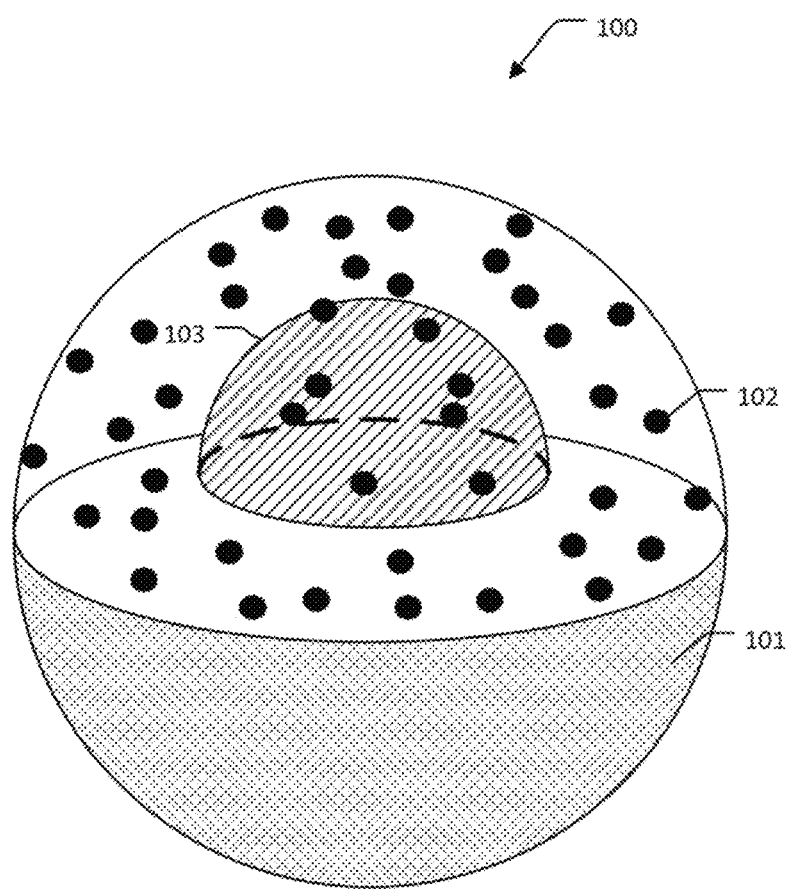
FIG. 1 schematically shows an embodiment of a deformable object for real-time dynamic sensing and reconstruction of its shape by an inside-out optical detection of embedded particles.

Before a detailed description of the embodiments under reference of FIG. 1, general explanations are made.

The embodiments described below in more detail disclose an electronic device comprising circuitry configured to capture an image of a pattern of light emitting photoluminescence particles embedded in an object and reconstruct the shape of the object based on the captured image of the pattern of light emitting photoluminescence particles embedded in the object.

Circuitry may include a processor, a memory (RAM, ROM or the like), a DNN unit, a storage, input means (mouse, keyboard, camera, etc.), output means (display (e.g. liquid crystal, (organic) light emitting diode, etc.), loudspeakers, etc., a (wireless) interface, etc., as it is generally known for electronic devices (computers, smartphones, gaming controller etc.).

The base material of the object may be made a polymer material. The outer surface of the object may be made of a non-transparent material.

An image may be comprise several rows and columns of pixels.

According to the embodiments the light emitting photoluminescence particles may be fluorescent quantum dots.

According to the embodiments the light emitting photoluminescence particles be phosphorescent phosphorous particles.

According to the embodiments the light emitting photoluminescence particles may be embedded in the body of the object.

Embedded in the body of the object may mean that the particles are distributed in the polymer base material of the body of the object.

According to the embodiments the light emitting photoluminescence particles may be embedded in the surface of the object.

Embedded in the surface of the object may mean that the particles are distributed in base material of the surface of the object.

According to the embodiments the pattern of light emitting photoluminescence particles may be a pattern of dots or a pattern of lines or a grid pattern.

A patter of dots may mean that there is a significant distance between two adjacent photoluminescence particles. A pattern of lines may mean that a line is formed with very little distance between two adjacent photoluminescence particles. A grid pattern may mean that the lines which form the grid, may be formed with very little distance between two adjacent photoluminescence particles.

According to the embodiments the circuitry may be configured to capture a stereo image pair of the pattern of light emitting photoluminescence particles and to reconstruct the shape of the object based on a digital image correlation algorithm applied to the stereo image pair.

The reconstructed shape of the object may be given by a set of scene points of the light emitting photoluminescence particles.

According to the embodiments the circuitry may be configured to reconstruct the shape of the object based on a detection of the light emitting photoluminescence particles in the captured stereo image pair.

The detection of the light emitting photoluminescence particles in the captured stereo image pair may mean to detect the pixels in the stereo image pair on which the light emitting photoluminescence particles are shown.

According to the embodiments the circuitry may be configured to reconstruct the shape of the object based on a beam profile analysis.

According to the embodiments the image may comprise two or more different patterns of light emitting photoluminescence particles embedded in the object.

According to the embodiments the light emitting photoluminescence particles of the two or more different patterns embedded in the object exhibit different emission wavelengths.

According to the embodiments the electronic device may further comprise a light source which is placed in the centre of the object, wherein the light emitting photoluminescence particles are illuminated and excited by the light source.

The centre of the object may be any place inside the object where the light source does not touch the inner surface of the object.

According to the embodiments the wavelength of the light source and the emission wavelength of the photoluminescence particles differ.

According to the embodiments the electronic device may further comprise an imaging system arranged inside the object, wherein the image of the pattern of light emitting photoluminescence particles embedded in an object is captured with imaging system.

According to the embodiments the imaging system may comprise an upper stereo vision system and lower stereo vision system which may be together able to perform a 360° stereo vision.

According to the embodiments the imaging system comprises two or more camera sensors with corresponding lens systems which may be able to capture a 360° view.

According to the embodiments the imaging comprises an upper and a lower spherically shaped imaging system which may comprise an array of micro-lenses and photodiodes, which may be able to capture a 360° view.

According to the embodiments the object exhibits high optical transparency in the visible and the near UV wavelength.

According to the embodiments the object may be made from ductile base material and is deformable.

The embodiments described below in more detail disclose a method comprising capturing an image of a pattern of light emitting photoluminescence particles embedded in an object, and reconstructing the shape of the object based on the captured image of the pattern of light emitting photoluminescence particles embedded in the object.

Embodiments are now described by reference to the drawings.

DETAILED DESCRIPTION OF EMBODIMENTS

FIG. 1 schematically shows an embodiment of a deformable object for real-time dynamic sensing and reconstruction of its shape by an inside-out optical detection of embedded particles. A highly deformable object 100 is made of a soft and ductile base material 101 (for example soft polymer or silicone), which exhibits high optical transparency in the visible and the near UV wavelength range. Light emitting photoluminescent particles 102 (e.g. quantum dots or phosphorous), which are emitting light at one or more wavelengths are introduced into the object's base material 101, such that the photoluminescent particles 102 are forming a well-defined pattern of photoluminescent particles, for example dots (see FIG. 2 for more details), lines, a grid etc. The pattern of photoluminescent particles 102 can be located at the surface of object 100 or within the body of the object 100 or both. In the centre of object 100, an imaging system and light source unit 103 is placed. The imaging system and light source unit 103 illuminates photoluminescent particles 102 and captures and records images (e.g. comprising position, structure, intensity profile) of the pattern of illuminated photoluminescent particles 102 embedded into object 100. The recorded images may be transmitted, for example wirelessly (WLAN, Bluetooth), to a receiver outside and processed at the receiver or the data may be processed in the imaging system and light source unit 103. The processing includes reconstruction the shape of the object 100 from the captured images of the pattern of photoluminescent particles 102. The reconstruction the shape of the object 100 from the captured images of the pattern of photoluminescent particles 102 may be performed by pattern recognition and/or beam profile analysis, which may use geometric models or computational algorithms (deterministic and/or machine learning). Because the shape detection is performed via pattern recognition and/or beam profile analysis of light originating from the emissive pattern of photoluminescent particles 102, it may be insensitive to the absolute intensity and to stray light.

The object 100 can for example be made of clay or modelling clay. Object 100 can have any default shape, like a sphere, a box etc.

The deformable object 100 for real-time dynamic sensing and reconstruction of its shape by an inside-out optical detection of embedded photoluminescent particles may be used as clay or modelling clay. It may further be used for live modelling of a component in areas where CAD modelling is applied. It may be further applied in prototype generation and design applications. It may be further used as interactive controller in gaming applications or the like.

Figure 2:
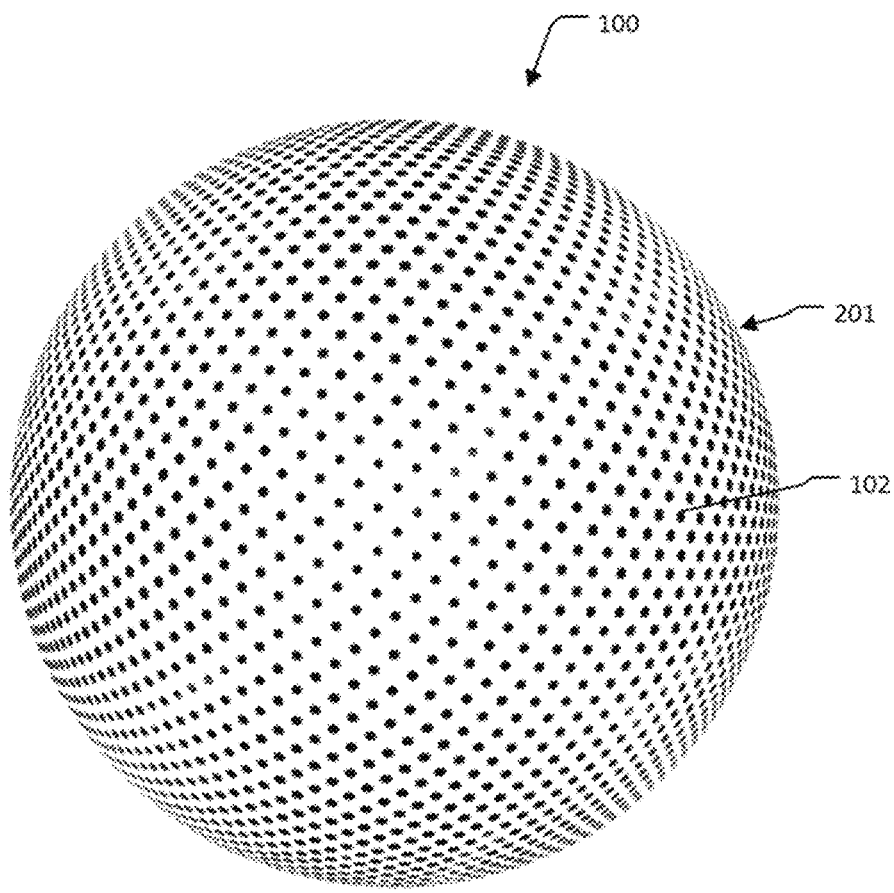
FIG. 2 shows an embodiment of a pattern of photoluminescent particles at the surface of an object.

FIG. 2 shows an embodiment of a pattern of photoluminescent particles at the surface of an object. A highly deformable spherical object 100 is made of a soft and ductile base material, which exhibits high optical transparency in the visible and the near UV wavelength range. Light emitting photoluminescent particles 102, which are emitting light at one or more wavelengths are introduced into the object's base material. The photoluminescent particles 102 form a pattern of dots 201 at the surface of the spherical object 100, i.e. the pattern 201 of dots is for example within a layer of 5 mm below the surface of the spherical object 100. The photoluminescent particles 102 are arranged homogeneously in the pattern of dots 201 along the longitude and latitude of the spherical object 100. For example, two adjacent particles are 1 mm away from each other.

Photoluminescence describes the light emission of matter after the absorption of photons. One form of photoluminescence is fluorescence where the emission after photon absorption typically has a lifetime in the nanoseconds range. Another form of photoluminescence is phosphorescence where the emission after photon absorption typically has lifetime in the milliseconds to hours range.

The light emitting photoluminescence particles 102 may be fluorescent quantum dots. Quantum dots are tiny semiconductor particles with only a few nanometres in size, for example made of cadmium selenide (CdSe) or cadmium telluride (CdTe). When a semiconductor quantum dot is illuminated by UV light, an electron in the quantum dot can be excited to a state of higher energy, i.e. the electron is excited from the valence to the conduction band, leaving behind a hole. The electron and the hole can bind to each other to form an exciton and when this exciton recombines, the exciton's energy can be emitted as light, i.e. fluorescence occurs. The wavelength of the emitted fluorescent light by the quantum dot depends on the quantum dot's size and can be tuned by changing the size of the quantum dot during its synthesis. The larger the dot, the redder and the smaller the dot the bluer the fluorescence spectrum of the quantum dot is. For example, cadmium selenide produces fluorescence at wavelengths from green (500 nm wavelength) to red (650 nm wavelength) by adjusting the nanocrystal diameter from 2 to 8 nm. For example, a cadmium selenide quantum dots with 8 nm in diameter may be used as the photoluminescence particles 102, which emit red fluorescent light (650 nm) when radiated with UV-light.

In another embodiment the light emitting photoluminescence particles 102 may be made of a phosphorescent phosphorous material. Phosphorescent materials are usually crystals with a small addition of an impurity that disturbs the crystal's grid structure. For example, the phosphorescent phosphorous particles may be Cu-doped zinc sulphide particles, i.e. ZnS:Cu particles, may be used. The ZnS:Cu particles may have a size between 3-8 nm and the emitted light (peak) around 510 nm when radiated with light around 254 nm.

In another embodiment the light emitting photoluminescent particles 102 may be arranged in a pattern of dots inside the body (volume) of the object 100. The light emitting photoluminescent particles 102 may also be arranged in a pattern of dots inside the body of the object 100 and at the surface of the object 100.

In another embodiment a deformable object into whose base material the photoluminescent particles 102 are introduced may have another shape, for example a cubic shape or a non-symmetrical shape.

A (well-defined) pattern of particles, is any well-defined arrangement of particles, i.e. the particles are arranged in a non-random, reproduceable and explicitly stated pattern. For example, the light emitting photoluminescent particles 102 may be arranged in (well-defined) pattern of lines inside the body and/or at the surface of an object or in a pattern which forms a grid pattern, inside the body and/or at the surface of an object In another embodiment the particles may be distributed randomly over the surface and/or the body of an object, wherein their initial position is known before the object is deformed.

In another embodiment a superposition of two or more different patterns of correspondingly two or more different light emitting photoluminescence particles may be embedded in the object either at the surface, in the body of the object or both may be implemented. In this case of two or more superimposed patterns of photoluminescent particles, the different pattern of photoluminescent particles may be made distinguishable by using correspondingly two or more different light emitting photoluminescence particles, probably made of correspondingly two or more different photoluminescent materials, embedded in an object. The two or more different light emitting photoluminescence particles exhibit different wavelengths for the particles of the different pattern of photoluminescent particles, i.e. the particles (materials) exhibit different emission wavelengths (i.e. different photoluminescent colours for each pattern of particles). For example, ZnS:Cu particles with a size between 3-8 nm and a emission light wavelength (peak) around 510 nm may be arranged in a first dot pattern at the surface of an object with a distance of 1 mm between adjacent ZnS:Cu particles and cadmium selenide quantum dots with 8 nm in diameter and a emission light wavelength around 650 nm may be arranged in a second dot pattern at the surface of the object with 1 mm between adjacent cadmium selenide quantum particles, so that the every 0.5 mm in an alternating fashion a ZnS:Cu particle and a cadmium selenide quantum particle is arranged.

In yet another embodiment one or more patterns of photoluminescent particles may be included into a foil into which a deformable object is wrapped.

Imaging System and Light Source Unit

The imaging and light source unit 103 comprises one or more light sources (for example in the UV wavelength) which homogeneously illuminate the full body and or surface of the object 100 and thereby stimulate light emission of the photoluminescent particles 102. The emission wavelength of the light source is chosen according to the excitation wavelength of the photoluminescent particles 102. The imaging system and light source unit 103 further comprises an imaging system which may comprises imaging sensors (with optics), which are arranged in such a way that the imaging system can capture a full 360° view of the interior of the object 100 around the centre of object 100 (see FIGS. 3-5 for more details). The imaging system and light source unit 103 further comprises a processing unit to the drive the imaging system and the light source and process the capturing, processing and transition of images.

Figure 3:
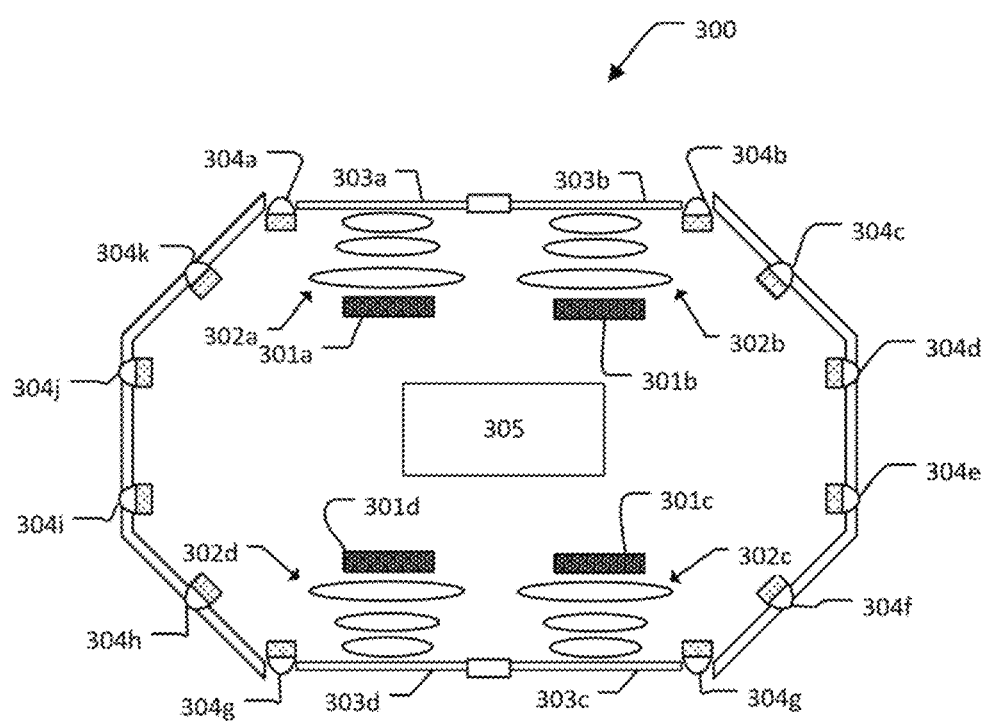
FIG. 3 schematically shows a cross section of a first embodiment of an imaging system and light source unit.

FIG. 3 schematically shows a cross section of a first embodiment of an imaging system and light source unit 103.

The cross section 300 of the imaging system and light source unit 103, is a cross section through the x-z-plane. The cross section 300 comprises four camera sensors (for example CMOS sensors) 301a-301d with corresponding lens systems (objectives) 302a-302d, The image sensors 301a and 301b with their corresponding lens systems 302a and 302b form an upper stereo vision system which is able to perform stereoscopic vision for the upper hemisphere (positive z-axis). Both lens systems 302a and 302b of the upper stereo vision system are wide angle lens systems with an angle of view of almost 180°. Further, the camera sensors 301c and 301d with their corresponding lens systems 302c and 302d form a lower stereo vision system which is able to perform stereoscopic vision for the lower hemisphere (negative z-axis). Both lens systems 302c and 302d of the lower stereo vision system are wide angle lens systems with an angle of view of almost 180°. With this described setup of camera sensors 301a-301a and lens systems 302a-302d an almost full 360° angle of view of the space surrounding the imaging system and light source unit 103 is captured in a stereoscopic way. The lens systems 302a and 302b are protected by transparent protection layers 303a and 303b, which may for example be made of glass. The lens systems 302c and 302d are protected by transparent protection layers 303c and 303d, which may for example be made of glass. Still further, LEDs 304a-304k are placed homogeneously around the surface of the imaging system and light source unit 103 to illuminate a full 360° space surrounding the imaging system and light source unit 103. The LEDs 304a-304k may emit UV-light. Raw data collected by the camera sensors 301a-301d may be sent to a processing unit 305 via an interface (for example Camera Serial Interface) to be further processed. The processing unit 305 may comprise a wireless interface like Bluetooth or wireless LAN to send data to an outside processor for further processing.

The Camera Serial Interface (CSI) may be a specification of the Mobile Industry Processor Interface (MIPI) Alliance. It may define an interface between a camera and a host processor. For example, the specifications of CSI-2 v1.1, CSI-3 v1.1 or CCS v1.0 may be used.

The LEDs may for example be μLEDs (micro LEDs). The location of the LEDs in FIG. 3 is to be understood schematically and more or less LEDs than shown in FIG. 3 may be placed around the surface of the imaging system and light source unit 103. In another embodiment other light sources than LEDs may be used, for example lasers or fluorescent lamps. The light source in general homogeneously illuminates the full volume and/or the surface of the object and stimulates light emission of the photoluminescent particles. The emission wavelength of the light source may be chosen according to the excitation wavelength(s) of the used photoluminescent material(s). For example, LEDs with an emission wavelength of 510 nm or 650 nm may be used. In another embodiment the emission wavelength of the LEDs may be in the UV-light range, for example 300 nm.

Figure 4:
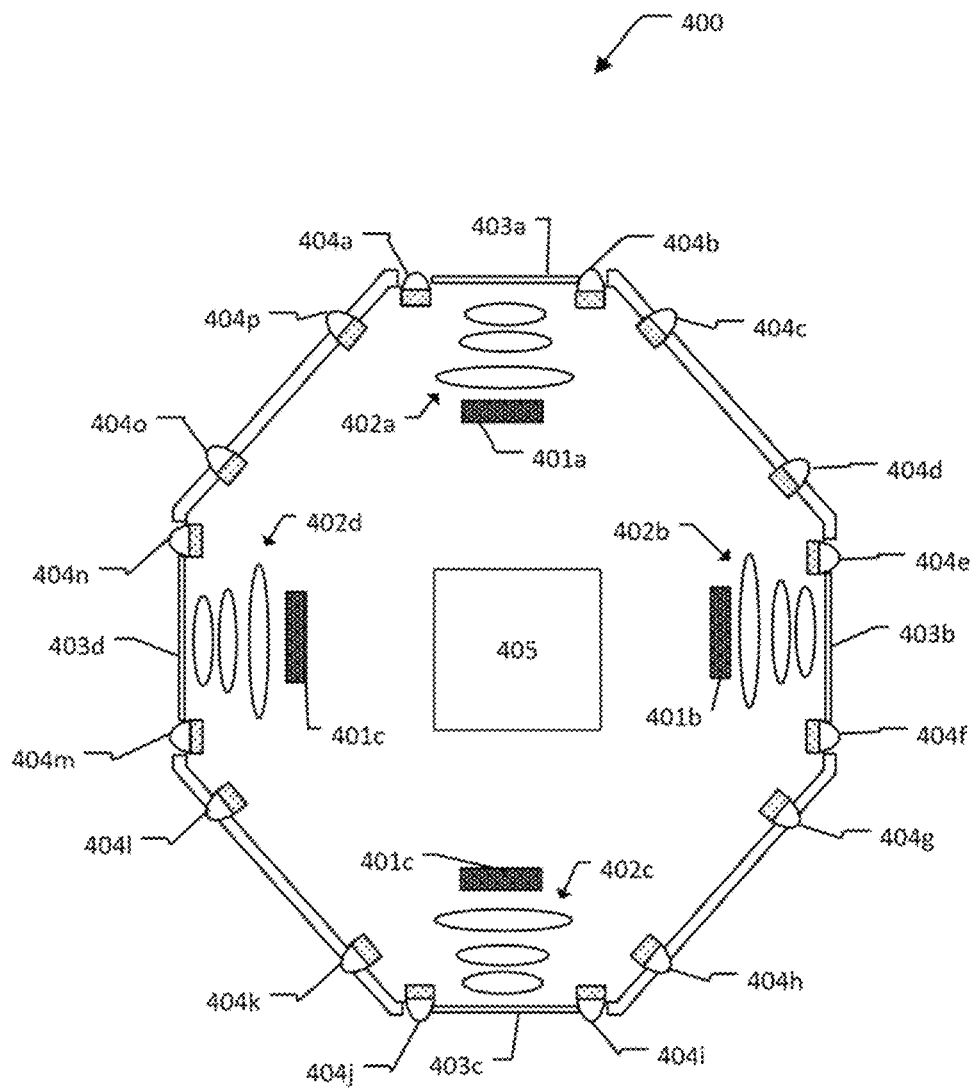
FIG. 4 schematically shows a cross section of a second embodiment of an imaging system and light source unit.

FIG. 4 schematically shows a cross section of a second embodiment of an imaging system and light source unit 103. The cross section 400 of the imaging system and light source unit 103 is a cross section through the x-z-plane. The cross section 400 comprises four camera sensors (for example CMOS sensors) 401a-401d with corresponding lens systems (objectives) 402a-402d. The camera sensor 401a and its corresponding lens system 402a is oriented along the positive z-axis (i.e. upwards); the camera sensor 401b and its corresponding lens system 402b is oriented along the positive x-axis (i.e. to the right); camera sensor 401c and its corresponding lens system 402c is oriented along the negative z-axis (i.e. downwards); camera sensor 401d and its corresponding lens system 402d is oriented along the negative x-axis (i.e. to the left). Each of the lens systems 402a-402d have at least an angle of view of 90° centered around their middle axis. Still further, respectively a camera sensor with corresponding lens system (at least an angle of view of 90°) is placed in direction of the positive y-axis and in direction of the negative y-axis (both not shown in FIG. 4). With this described setup of camera sensors and lens systems a full 360° angle of view of the space surrounding the imaging system and light source unit 103 can be captured. The lens systems 402a-402d are respectively protected by transparent protection layers 403a-403d, which may for example be made of glass. Still further, LEDs 404a-404p are placed homogeneously around the surface of the imaging system and light source unit 103 to illuminate a full 360° space surrounding the imaging system and light source unit 103. The LEDs 404a-404p may emit UV-light. Raw data collected by the camera sensors 301a-301d may be sent to a processing unit 405 via an interface (for example Camera Serial Interface) to be further processed. The processing unit 405 may comprise a wireless interface like Bluetooth or wireless LAN to send data to an outside processor.

The LEDs may for example be μLEDs (micro LEDs). The location of the LEDs in FIG. 4 is to be understood schematically and more or less LEDs than shown in FIG. 4 may be placed around the surface of the imaging system and light source unit 103. In another embodiment other light sources than LEDs may be used, for example lasers or fluorescent lamps. The light source in general homogeneously illuminates the full volume and/or the surface of the object and stimulates light emission of the photoluminescent particles. The emission wavelength of the light source may be chosen according to the excitation wavelength(s) of the used photoluminescent material(s). For example, LEDs with an emission wavelength of 510 nm or 650 nm may be used. In another embodiment the emission wavelength of the LEDs may be in the UV-light range, for example 300 nm In another embodiment the camera sensors with their corresponding lens systems and the light sources may not be arranged at the six faces of a cube as in FIG. 4 but for example at the 8 faces of a octahedron (i.e. 8 camera and lens systems) or the 12 faces of Dodecahedron (i.e. 12 camera and lens systems) or at the faces of any other polyhedron or along the surface of another geometric shape. In another embodiment there may be used less than 6 camera sensors for example 2, 3 or 4 camera sensors with corresponding lens systems. The camera sensors with their corresponding lens systems and the light sources may always be arrange such that the full 360° view around the imaging system and light source unit 103 is illuminated by the light source(s) and captured by the camera sensors with their corresponding lens.

Figure 5:
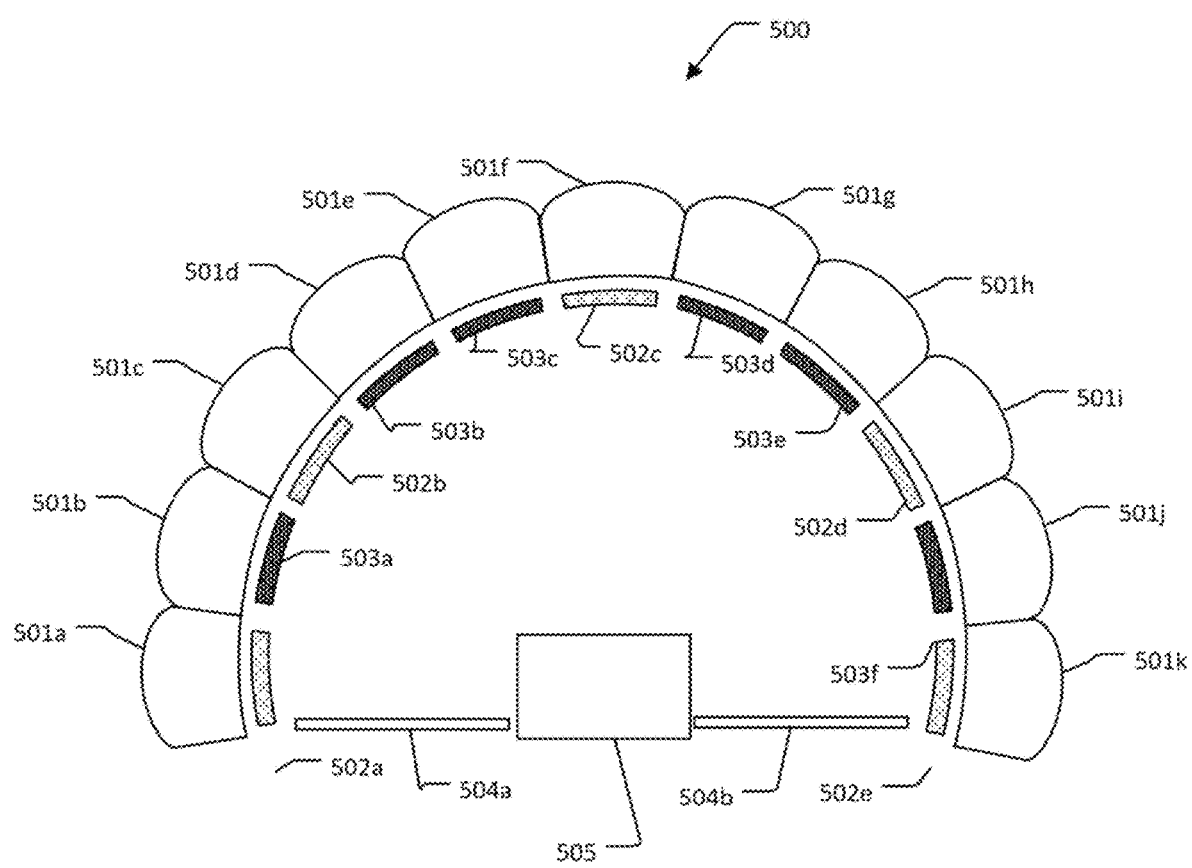
FIG. 5 schematically shows a cross section of a third embodiment of an imaging system and light source unit.

FIG. 5 schematically shows a cross section of a third embodiment of an imaging system and light source unit 103. The cross section 500 of the imaging system and light source unit 103, is a cross section through the x-z-plane and shows the upper hemisphere of a spherically shaped imaging system and light source unit 103. A micro lens array 501 comprises the micro lenses 501a-501j, which are arranged alongside of a spherical surface of a spherical imaging system with light sources. Under micro-lenses 501b, 501d, 501e, 501g, 501h and 501j photodiodes 503a-503f are arranged. The micro-lenses 501b, 501d, 501e, 501g, 501h and 501j may have such an angle of view that the upper hemisphere of the imaging system and light source unit 103 captures 180° of the complete upper hemisphere, for example each micro lens has an angle of view of 45°. The micro-lenses and photodiodes are arranged homogeneously around the upper hemisphere of the imaging system and light source unit 103. The lower hemisphere of the imaging system and light source unit 103 is symmetrical to the upper hemisphere of the imaging system and light source unit 103. Together, the upper and the lower hemisphere of the spherically shaped imaging system and light source unit 103 capture a full 360° angle of view of the space surrounding the imaging system and light source unit 103. Under micro lenses 501a, 501c, 501f, 501i and 501k micro LEDs 503a-503e are placed. The micro lenses 501a, 501c, 501f, 501i and 501k may have other optical properties as the micro lenses 501b, 501d, 501e, 501g, 501h and 501j. For example, the micro lenses 501a, 501c, 501f, 501i and 501k may defocus the light from the micro LEDs 503a-503e in a wide angle, for example 120°. Two micro lenses with the corresponding micro LEDs are placed at the equator along the x axis, i.e. 501a with 502a and 502e with 501k. Two micro lenses with the corresponding micro LEDs are placed correspondingly along the at the equator along the y axis (not shown in FIG. 5). The micro lenses with the corresponding micro LEDs around the equator are placed such that they symmetrically illuminate a part of the upper hemisphere as well as a part of the lower hemisphere. Still further, two micro lenses with the corresponding micro LEDs are placed at circa 45° along the x axis, i.e. 501c with 502b and 502d with 501i. Two micro lenses with the corresponding micro LEDs are placed correspondingly at circa 45° along the y axis (not shown in FIG. 5). The micro LEDs arranged in the upper hemisphere of the imaging system and light source unit 103 as shown in FIG. 5 together with a symmetrically arranged micro LEDs in a lower hemisphere of the imaging system and light source unit 103 illuminate a full 360° space surrounding the imaging system and light source unit 103. The photodiodes 503a-503f process incoming light and transmit it via interfaces 504a, 504b (for example CSI interfaces) to a processing unit 505 to be further processed. The processing unit 505 may comprise a wireless interface like Bluetooth or wireless LAN to send data to an outside processor.

The hemispherical imaging system as described in FIG. 5 is described in more detail in the scientific paper "Digital cameras with designs inspired by the arthropod eye", by Song, Young Min, et al., published in Nature 497.7447 (2013): 95-99.

The drawings of FIG. 5 are to be understood schematically, and the micro LEDs with corresponding micro lenses may for example only occupy 1/10 or 1/5 of the space that is occupied the photodiodes corresponding micro lenses.

In another embodiment under micro-lenses 501b, 501d, 501e, 501g, 501h and 501j instead of photodiodes 503a-503f, full camera sensors (for example CMOS sensors) may be placed.

In case of a single pattern of photoluminescent particles a monochromatic camera sensor or photodiode may be used, whereas for two or more superimposed different pattern of photoluminescent particles with different colours a full-colour sensor may be used. In general, because the emission wavelength of the light source (ultraviolet) and detection wavelength of the photoluminescent particles (for example visible) differ a good spectral separation/filtering is possible and interference effects may be superseded.

For example, LEDs with an emission wavelength of 510 nm or 650 nm may be used, or LEDs in the UV-light range, for example 300 nm.

Figure 6:
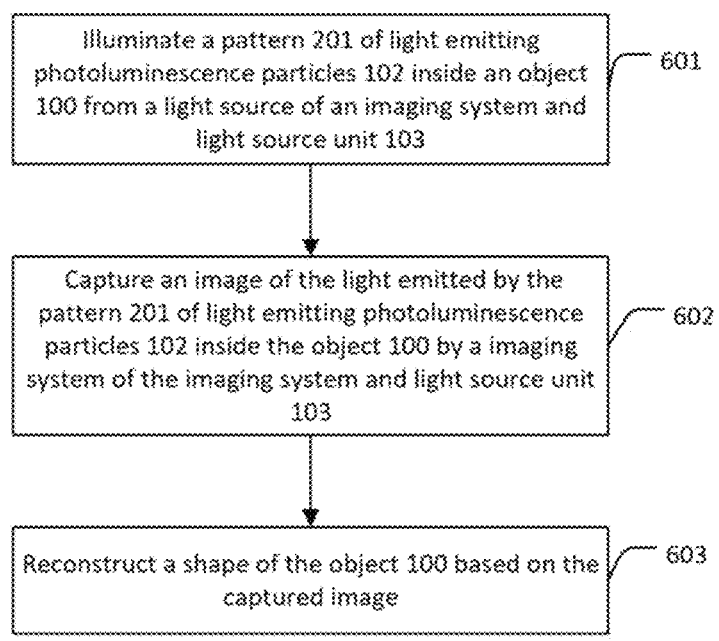
FIG. 6 shows a flowchart of real-time dynamic reconstruction of the shape of a deformable object by an inside-out optical detection of embedded particles.

FIG. 6 shows a flowchart of real-time dynamic reconstruction of a shape of a deformable object by an inside-out optical detection of embedded particles. In step 601, a pattern 201 of light emitting photoluminescence particles 102 inside an object 100 are illuminated from a light source of an imaging system and light source unit 103. In step 602, an image of the light emitted by the pattern 201 of light emitting photoluminescence particles 102 inside the object 100 is captured by the imaging system of the imaging system and light source unit 103. In step 603, a shape of the object 100 is reconstructed based on the captured image.

Shape Reconstruction

The shape of an object is reconstructed based on a captured image of light emitted by a pattern of light emitting photoluminescence particles inside the object for example by pattern recognition or by beam profile analysis which may make use of geometric models or computational algorithms (deterministic and/or machine learning).

In a first embodiment (see FIG. 7) a reconstruction method of the shape of a deformable object is described which is well known under the name Digital Image Correlation (DIC) or more specifically Image Pattern Correlation Technique (IPCT). This approach is for example explained in more detail in the scientific paper "Digital image correlation for surface deformation measurement: historical developments, recent advances and future goals", by Pan, Bing, published in Measurement Science and Technology 29.8 (2018): 082001, or scientific paper "3D deformation measurement using stereo-correlation applied to experimental mechanics", by Garcia, Dorian, and Jean-José Orteu published in Proceedings of the 10th FIG international symposium deformation measurements, 2001 or in the scientific paper "Real-time 3D digital image correlation method and its application in human pulse monitoring", by Shao, Xinxing, et al., published in Applied optics 55.4 (2016): 696-704. In this embodiment an imaging system and light source unit 103 with a stereo vision system as described in FIG. 3 may be used which is able to perform stereoscopic vision. Further, in this embodiment the pattern 201 of light emitting photoluminescence particles 102 may be introduced into the surface of the object.

Figure 7:
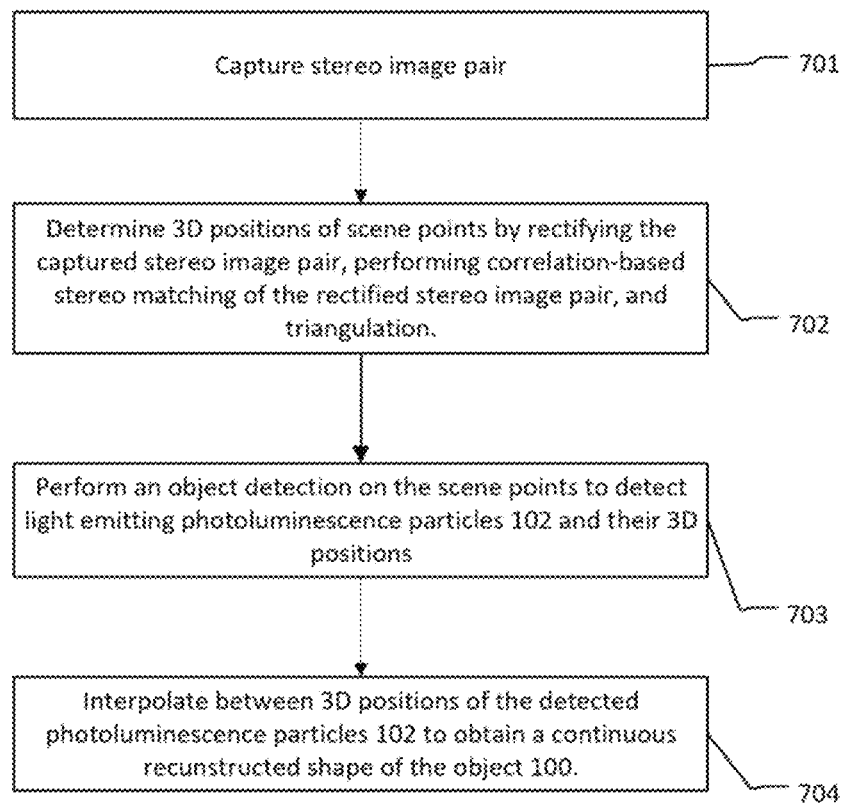
FIG. 7 shows flowchart of a reconstruction of a shape of a deformable object by Digital Image Correlation algorithm.

FIG. 7 shows flowchart of a reconstruction of a shape of a deformable object by Digital Image Correlation algorithm. In step 701, a stereo image pair is captured. In step 702, 3D positions of scene points by rectifying the captured stereo image pair is determined, a correlation-based stereo matching is performed on the rectified stereo image pair, and a triangulation is performed. A scene point may be a 3D coordinate, for example in a global coordinate system, of a matched pixel in the stereo image pair. In other words, a scene point may be the 3D coordinate of an object which is shown in a matched pixel in the stereo image pair. In step 703, an object detection on the scene points to detect light emitting photoluminescence particles 102 and their 3D positions is performed. In step 704, it is interpolated between 3D positions of the detected photoluminescence particles 102 to obtain a continuous reconstructed shape of the object 100.

A shape of the object 100 is already reconducted after the completion of step 703. Before the image is captured a calibration may be performed on the camera sensors 301a-d and the corresponding lens systems 302a-d which yields calibration parameters. The calibration parameters comprise for example intrinsic parameters of the camera sensors 301a-d and the corresponding lens systems 302a-d, such as the focal length, skew, distortion and the image center of the lens systems 302a-d and the comprises extrinsic parameters camera sensors 301a-d and the corresponding lens systems 302a-d, such as the position and orientation of the camera sensors 301a-d in a global coordinate systems as well as the relative position and orientation between the camera sensor 301a and 301b and the camera sensor 301c and 301d. The object detection may be performed with machine learning methods like Viola-Jones object detection algorithm based on Haar features, on scale-invariant feature transforms (SIFT), on a histogram of oriented gradients (HOG) features method or the like, or on deep learning approaches like region proposals, Single Shot MultiBox Detectors (SSD), deformable convolutional networks or the like. The interpolation between 3D positions (i.e. scene points) of the detected photoluminescence particles 102 may be carried out with polynomial interpolation, with B-Splines, with Bezier-curves or the like.

The process described with respect to FIG. 7 is applied to the stereo image pair of the pattern 201 of light emitting photoluminescence particles 102 captured by the camera sensors 301a and 301b of the upper stereo vision system with an angle of view of 180° and on a stereo image pair of the pattern 201 of light emitting photoluminescence particles 102 captured by the camera sensors 301c and 301d of the lower stereo vision system with an angle of view of 180°. Therefore, a scene point of every light emitting photoluminescence particle 102 inside the object 100 in a 360° space surrounding the imaging system and light source unit 103 is determined and thereby a shape of the object 100 is reconstructed. A continuous shape of the object 100 may be reconstructed by further applying interpolation as described above.

The process described with respect to FIG. 7 is described in more detail in scientific paper "3D deformation measurement using stereo-correlation applied to experimental mechanics", by Garcia, Dorian, and Jean-José Orteu published in Proceedings of the 10th FIG international symposium deformation measurements, 2001.

The correlation-based stereo matching of the rectified stereo image pair may be carried out by several different algorithms. For example, feature matching algorithms may be applied, or template matching algorithms or correlation algorithms developed for the Particle Image Velocimetry (PIV). Due to the known pattern 201 of light emitting photoluminescence particles 102 the correlation algorithms may be speed up and increased in accuracy of the mapping between respectively two points compared to a random pattern of light emitting photoluminescence particles. The speed and accuracy of the correlation algorithms may be further increased if more than one pattern of light emitting photoluminescence particles 102 is introduced into the surface and/or body of the object. In another embodiment a technique called Digital Volume Correlation (DVC) may be used to reconstruct a shape of the object 100.

Figure 8:
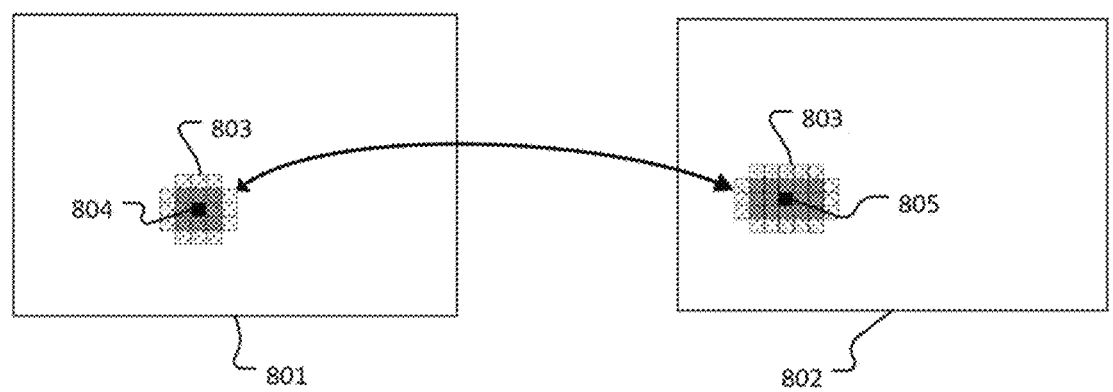
FIG. 8 shows an example of the process of correlating of a stereo image pair to identify matching pixels.

FIG. 8 shows an example of the process of correlating a stereo image pair to identify matching pixels. A left stereo image 801 (for example taken by the camera sensor 301a) and a right stereo image 802 (for example taken by the camera sensor 301b) consists of individual pixels according to the resolution and colour depth of the camera sensor. The stereo image pair 801 and 802 are correlated with each other to identify matching pixels, which yields a correlated image. The expert can use known suitable image correlation methods as mentioned above. In the correlation process it is detected that an object 803 (for example one of the photoluminescence particles 102) is imaged in both images 801 and image 802 and that, for example, pixel 804 in image 801 matches pixel 805 in image 802. The position of the object 803 in image 801 differs from the position of the object 803 in image 802 because of the different camera sensor (for example 301a and 301b) positions and orientations. The shape of the image of the object 804 in the second camera image 802 may also differ from the shape of the object in the first camera image 801 due to probably the change in perspective. From the different positions of, for example, pixel 804 in image 801 compared to pixel 805 in image 802, the position of the pixel in the three-dimensional space can be deduced using triangulation (stereoscopic) techniques In another embodiment a shape of the object 100 is reconstructed with a beam profile analysis performed on light beams emitted by the illuminated pattern 201 of light emitting photoluminescence particles 102 introduced into the object 100. The emitted light beams are captured by camera sensors (for example CMOS) or photodiodes of the imaging system and light source unit 103. The beam profile is analysed and from the analysed beam profile the distance and location of each particle 102 is determined and the shape of the object 100 is reconstructed.

A beam profile is the 2D irradiance plot of a beam at a given location (for example at the camera sensor of the imaging system and light source unit 103) along the beam path.

The beam profile analysis may be based on a technique call Focus-Induced Photoresponse (FIP). In the FIP technique, a light source (for example the beams emitted light by the illuminated pattern 201 of light emitting photoluminescence particles 102) is imaged onto a photodetector by a lens. The size of the image of the light source depends on the position of the photodetector with respect to the focused image plane. The FIP technique exploits the nonlinearly irradiance-dependent photoresponse of semiconductor devices (such as photodiodes or CMOS camera sensors) which means that the signal of a photodetector (i.e. a CMOS camera sensor or a photodiode inside the imaging system and light source unit 103) not only depends on the incident radiant power of the light beam, but also on its density on the sensor area, the irradiance. This the nonlinearly irradiance-dependent photoresponse will cause the output of the detector to change when the same amount of light is focused or defocused on it and will cause the output of the sensor to change based on how far in or out of focus an object is. How far in or out of focus the pattern of light emitting photoluminescence particles introduced into the object 100 is dependent on the shape of the object which can be reconstructed. This is also described in more detail in the scientific paper "Focus-Induced Photoresponse: a novel way to measure distances with photodetectors", by Pekkola, Oili, et al. published in Scientific reports 8.1 (2018): 1-8."

The irradiance of a light beam may refer to what amount of energy arrives on a certain surface with a given orientation and intensity of a light beam may be defined as the amount of energy going through an area perpendicular to the beam.

Therefore, the image sensor inside the imaging system and light source unit 103 is calibrated on a certain focus and with a certain irradiance from the received light beams emitted by the illuminated pattern 201 of light emitting photoluminescence particles 102 in state where the object is a default undeformed shape. Then by analysing the beam profile (i.e. the irradiance on the image sensor) of the light beams emitted by the illuminated pattern 201 of light emitting photoluminescence particles 102 inside the deformed object 100, the location of each of light emitting photoluminescence particles 102 can be determined and thereby a shape of the object can be reconstructed.

In another embodiment a shape of the object 100 can be determined be using machine learning techniques. This may be done by deforming the object 100 into a shape which is known in global coordinates, e.g. by a 3D scanner like ToF. Then an image of the light emitted by the illuminated pattern 201 of light emitting photoluminescence particles 102 of the deformed object is captured with the imaging system and light source unit 103. This process is repeated to build a database of labelled pairs of captured images of the light emitted light by the illuminated pattern 201 of light emitting photoluminescence particles 102 and the correspondingly known global coordinates of the object 100. With the database of labelled pairs, a machine learning algorithm is trained, for example a deep neural network (DNN). In operational mode, the trained DNN is then able to determine global coordinates of the object 100.

In another embodiment an external force which is applied to the object 100 can be determined. This may be done by applying a known normal force to the object 100 thereby deforming the object and capturing an image of the emitted light by the illuminated pattern 201 of light emitting photoluminescence particles 102 with the imaging system and light source unit 103. This process is repeated to build a database of labelled pairs of captured images of the light emitted by the illuminated pattern 201 of light emitting photoluminescence particles 102 and the correspondingly applied normal force to the object 100. With the database of labelled pairs, a machine learning algorithm is trained, for example a deep neural network (DNN). In operational mode, the trained DNN is then able to determine the applied normal force to the object 100. This is described in more detail in the scientific paper "Design, motivation and evaluation of a full-resolution optical tactile sensor", by Sferrazza, Carmelo.

Implementation

Figure 9:
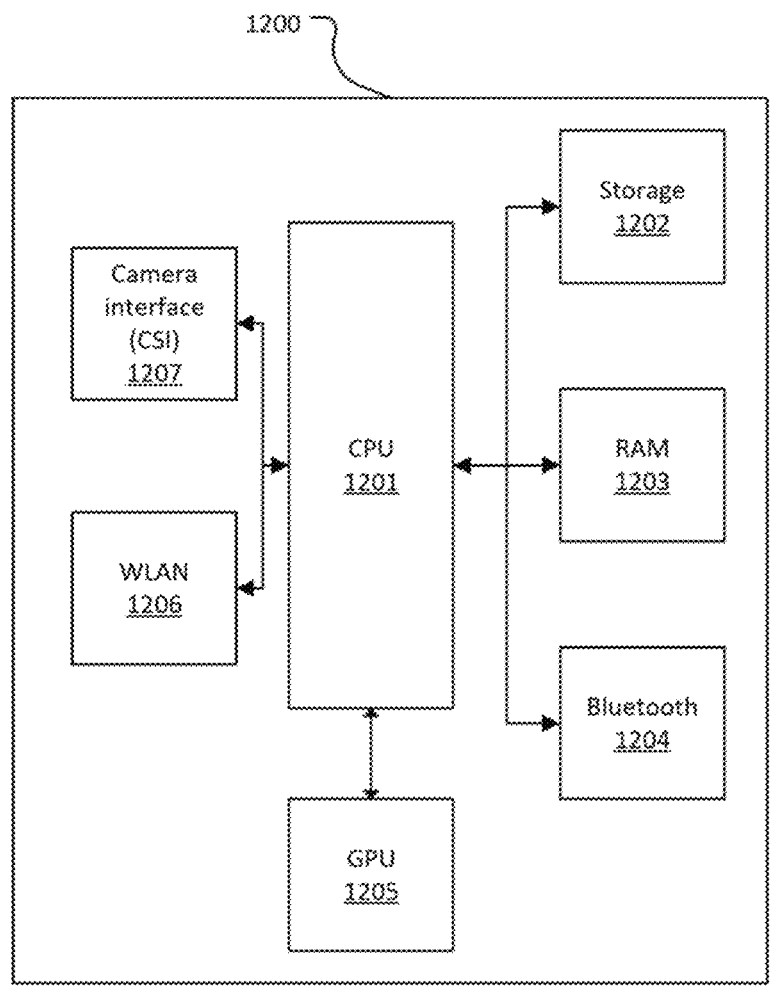
FIG. 9 schematically describes an embodiment of an electronic device which may implement the functionality of a processing unit.

FIG. 9 schematically describes an embodiment of an electronic device which may implement the functionality of a processing unit 305, 405, 505. The electronic device 1200 may control the illumination of photoluminescence particles inside an object and control the capturing of an image of the emitted light of the photoluminescence particles and process the captured image to reconstruct a shape of the object. The electronic device 1200 may also implement the functionality of a processor which received a capture image to reconstruct a shape of the object. The electronic device 1200 may further implement the functionality of training and operation of a deep neural network for shape reconstruction of an object or for determination of an external force applied to an object. The electronic device 1200 comprises a CPU 1201 as processor. The electronic device 1200 further comprises a GPU 1205 which is able to train and operate a DNN, which is connected to the processor 1201. The electronic system 1200 further comprises a Camera Serial Interface (CSI) interface 1207 which connects the camera sensors or photodiode to the processor 1201. The CSI interface may be a specification of the Mobile Industry Processor Interface (MIPI) Alliance and may a specified as CSI-2 v3.0, CSI-3 v1.1 or CCS v1.0 or the like. The electronic system 1200 further comprises a Bluetooth 1204 and WLAN 1206 module to receive or sent data from/to external devices. The electronic device 1200 further comprises a data storage 1202 and a data memory 1203 (here a RAM). The data memory 1203 is arranged to temporarily store or cache data or computer instructions for processing by the processor 1201. The data storage 1202 is arranged as a long-term storage, e.g., for recording images, or coordinates of a reconstructed shape of an object.

It should be recognized that the embodiments describe methods with an exemplary ordering of method steps. The specific ordering of method steps is, however, given for illustrative purposes only and should not be construed as binding.

It should also be noted that the division of the electronic device of FIG. 9 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) An electronic device comprising circuitry configured to capture an image of a pattern (201) of light emitting photoluminescence particles (102) embedded in an object (100), and reconstruct the shape of the object (100) based on the captured image of the pattern (201) of light emitting photoluminescence particles (102) embedded in the object (100).

(2) The electronic device of (1), wherein the light emitting photoluminescence particles (102) are fluorescent quantum dots.

(3) The electronic device of (1) or (2), wherein the light emitting photoluminescence particles (102) are phosphorescent particles.

(4) The electronic device of anyone of (1) to (3), wherein the light emitting photoluminescence particles (102) are embedded in the body of the object (100).

(5) The electronic device of anyone of (1) to (4), wherein the light emitting photoluminescence particles (102) are embedded in the surface of the object (100).

(6) The electronic device of anyone of (1) to (5), wherein the pattern (201) of light emitting photoluminescence particles (102) is a pattern of dots (201) or a pattern of lines or a grid pattern.

(7) The electronic device of anyone of (1) to (6), wherein the circuitry is configured to capture a stereo image pair of the pattern (201) of light emitting photoluminescence particles (102) and to reconstruct the shape of the object (100) based on a digital image correlation algorithm applied to the stereo image pair.

(8) The electronic device of (7), wherein the circuitry is configured to reconstruct the shape of the object (100) based on a detection of the light emitting photoluminescence particles (102) in the captured stereo image pair.

(9) The electronic device of anyone of (1) to (8), wherein the circuitry is configured to reconstruct the shape of the object (100) based on a beam profile analysis.

(10) The electronic device of anyone of (1) to (9), wherein the image comprises two or more different patterns (201) of light emitting photoluminescence particles (102) embedded in the object (100).

(11) The electronic device of (10), wherein the light emitting photoluminescence particles (102) of the two or more different patterns (201) embedded the object (100) exhibit different emission wavelengths.

(12) The electronic device of anyone of (1) to (11), further comprising a light source which is placed in the centre of the object (100), wherein the light emitting photoluminescence particles (102) are illuminated by the light source.

(13) The electronic device of (12), wherein the wavelength of the light source and the emission wavelength of the photoluminescence particles (102) differ.

(14) The electronic device of anyone of (1) to (13) further comprising an imaging system arranged inside the object (100), wherein the image of the pattern (201) of light emitting photoluminescence particles (102) embedded in an object (100) is captured with imaging system.

(15) The electronic device of (14), wherein the imaging system comprises an upper stereo vision system and a lower stereo vision system which are together able to perform 360° stereo vision.

(16) The electronic device of (14), wherein the imaging system comprises two or more camera sensors with corresponding lens systems which are able to capture a 360° view.

(17) The electronic device of (14), wherein the imaging comprises an upper and a lower spherically shaped imaging system which comprises an array of microlenses and photodiodes, which are able to capture a 360° view.

(18) The electronic device of anyone of (1) to (17), wherein the object exhibits high optical transparency in the visible and the near UV wavelength.

(19) The electronic device of anyone of (1) to (18), wherein the object is made from a ductile base material and is deformable

(20) A method comprising capturing an image of a pattern (201) of light emitting photoluminescence particles (102) embedded in an object (100), and reconstructing the shape of the object (100) based on the captured image of the pattern (201) of light emitting photoluminescence particles (102) embedded in the object (100).

The invention claimed is:

1. An electronic device comprising:
a detector to be positioned in a center of an object having light emitting photoluminescence particles embedded therein, the light emitting photoluminescence particles being arranged in a discrete pattern, the detector having a 360° field of view, the detector including
at least two light sources to illuminate the light emitting photoluminescence particles;
at least two sensors arranged inside the object, wherein an image of the discrete pattern of light emitting photoluminescence particles embedded in the object is captured with at least two sensors, wherein the at least two light sources and the at least two sensors are alternately arranged in the detector to output light to and receive light from the light emitting photoluminescence particles in the object; and
circuitry configured to
capture the image of the discrete pattern of light emitting photoluminescence particles embedded in the object, and
reconstruct the shape of the object based on the captured image of the discrete pattern of light emitting photoluminescence particles embedded in the object.

2. The electronic device according to claim 1, wherein the light emitting photoluminescence particles are fluorescent quantum dots.

3. The electronic device according to claim 1, wherein the light emitting photoluminescence particles are phosphorescent particles.

4. The electronic device according to claim 1, wherein the light emitting photoluminescence particles are embedded in the body of the object.

5. The electronic device according to claim 1, wherein the light emitting photoluminescence particles are embedded in the surface of the object.

6. The electronic device according to claim 1, wherein the discrete pattern of light emitting photoluminescence particles is a pattern of dots or a pattern of lines or a grid pattern.

7. The electronic device according to claim 1, wherein the circuitry is configured to capture a stereo image pair of the discrete pattern of light emitting photoluminescence particles and to reconstruct the shape of the object based on a digital image correlation algorithm applied to the stereo image pair.

8. The electronic device according to claim 7, wherein the circuitry is configured to reconstruct the shape of the object based on a detection of the light emitting photoluminescence particles in the captured stereo image pair.

9. The electronic device according to claim 1, wherein the circuitry is configured to reconstruct the shape of the object based on a beam profile analysis.

10. The electronic device according to claim 1, wherein the image comprises two or more different discrete patterns of light emitting photoluminescence particles embedded in the object.

11. The electronic device according to claim 10, wherein the light emitting photoluminescence particles of the two or more different discrete patterns embedded the object exhibit different emission wavelengths.

12. The electronic device according to claim 1, wherein the wavelength of the light source and the emission wavelength of the photoluminescence particles differ.

13. The electronic device according to claim 1, wherein the at least two sensors include an upper stereo vision system and a lower stereo vision system which are together.

14. The electronic device according to claim 1, wherein the at least two sensors have corresponding lenses for the 360° view.

15. The electronic device according to claim 1, wherein the two sensors includes an upper and a lower spherically shaped array of micro-lenses and corresponding photodiodes.

16. The electronic device according to claim 1, wherein the object exhibits high optical transparency in the visible and the near UV wavelength.

17. The electronic device according to claim 1, wherein the object is made from ductile base material and is deformable.

18. A method comprising
positioning a detector in a center of an object having light emitting photoluminescence particles embedded therein, the light emitting photoluminescence particles being arranged in a discrete pattern, the detector having a 360° field of view, the detector including at least two light sources to illuminate the light emitting photoluminescence particles;

at least two sensors, wherein an image of the discrete pattern of light emitting photoluminescence particles embedded in the object is captured with the at least two sensors, wherein the at least two light sources and the at least two sensors are alternately arranged in the detector to output light to and receive light from the light emitting photoluminescence particles in the object;

capturing the image of the discrete pattern of light emitting photoluminescence particles embedded in the object; and reconstructing the shape of the object based on the captured image of the discrete pattern of light emitting photoluminescence particles embedded in the object.

19. The method according to claim 18, wherein the discrete pattern of light emitting photoluminescence particles is a well-defined pattern.

20. The method according to claim 18, wherein the well-defined pattern is a pattern of dots, a pattern of lines, or a grid pattern.

21. The method according to claim 18, wherein the discrete pattern of light emitting photoluminescence particles is a random pattern.

22. The electronic device according to claim 1, wherein the discrete pattern of light emitting photoluminescence particles is a well-defined pattern.

23. The electronic device according to claim 1, wherein the discrete pattern of light emitting photoluminescence particles is a random pattern.

* * * * *